(12) United States Patent
Hibbeler et al.

(10) Patent No.: US 7,093,234 B2
(45) Date of Patent: Aug. 15, 2006

(54) DYNAMIC CPU USAGE PROFILING AND FUNCTION CALL TRACING

(75) Inventors: Jason D. Hibbeler, Williston, VT (US); Jhy-Chun Wang, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 519 days.

(21) Appl. No.: 09/939,005

(22) Filed: Aug. 24, 2001

(65) Prior Publication Data

US 2003/0041316 A1 Feb. 27, 2003

(51) Int. Cl.
G06F 9/44 (2006.01)
G06F 9/45 (2006.01)

(52) U.S. Cl. ................. 717/124; 717/127; 717/128

(58) Field of Classification Search ........ 717/124–136, 717/140, 158–162, 147, 148
See application file for complete search history.

(56) References Cited

U.S. PATENT DOCUMENTS

| | | | |
|---|---|---|---|
| 5,121,501 A | | 6/1992 | Baumgartner et al. |
| 5,347,649 A | | 9/1994 | Alderson |
| 5,355,487 A | | 10/1994 | Keller et al. |
| 5,446,876 A | | 8/1995 | Levine et al. |
| 5,594,864 A | | 1/1997 | Trauben |
| 5,664,095 A | | 9/1997 | Cox et al. |
| 5,761,091 A | | 6/1998 | Agrawal et al. |
| 5,797,115 A | | 8/1998 | Fuller |
| 5,850,562 A | * | 12/1998 | Crump et al. ................... 713/1 |
| 5,884,080 A | * | 3/1999 | Blandy et al. ............... 717/130 |
| 5,890,014 A | * | 3/1999 | Long ............................. 710/8 |
| 5,907,704 A | * | 5/1999 | Gudmundson et al. ..... 717/100 |
| 5,950,000 A | * | 9/1999 | O'Leary et al. ............ 717/105 |
| 5,964,893 A | | 10/1999 | Circello et al. |
| 6,086,618 A | | 7/2000 | Al-Hilali et al. |
| 6,189,142 B1 | * | 2/2001 | Johnston et al. ............ 717/125 |
| 6,353,923 B1 | * | 3/2002 | Bogle et al. ................ 717/128 |
| 6,412,106 B1 | * | 6/2002 | Leask et al. ................ 717/124 |
| 6,708,169 B1 | * | 3/2004 | Berry et al. .................... 707/7 |
| 6,708,327 B1 | * | 3/2004 | Aliphas ....................... 717/125 |
| 6,728,949 B1 | * | 4/2004 | Bryant et al. ............... 717/127 |
| 6,848,097 B1 | * | 1/2005 | Alverson et al. ........... 717/124 |
| 6,981,248 B1 | * | 12/2005 | Bates et al. ................. 717/129 |

FOREIGN PATENT DOCUMENTS

JP 6342386 A 9/1992

OTHER PUBLICATIONS

Ingles, Dynamic Probe Class Library—A Parallel Tools Consortium Project, Aug. 30, 2000, pp. 1-4.*

(Continued)

Primary Examiner—Anil Khatri
(74) Attorney, Agent, or Firm—Lawrence D. Cutter; Jon A. Gibbons; Fleit, Kain, Gibbons, Gutman, Bongini & Bianco P.L.

(57) ABSTRACT

A method, and computer readable medium for the dynamic CPU (Central Processing Unit) usage and function call tracing on a target application. The setup of the tracing uses a -pg like solution, and is implemented using the DPCL (Dynamic Probe Class Library). The output is presented in a gmon.out format, which allows the use of popular analysis tools. The program being traced need not be recompiled or re-linked. This is particularly important if the source code is not available. The dynamic feature allows for different choices of profiling and the choice can even be changed once the target application is running.

19 Claims, 9 Drawing Sheets

OTHER PUBLICATIONS

Lawrence Livermore National Laboratory, Performance Analysis Tools, Jun. 27, 2001, sections 4 and 6.*

Derose et al., The Dynamic Probe Class Library—An Infrastructure for developing instrumentation . . . , IEEE, pp. (all).*

Joshi et al, "Targeted path profiling: lower overhead path profiling for staged dynamic optimization systems", IEEE CGO, pp. 1-12, 2004.*

Wang et al, "Using compressed bytecode traces for slicing java programs", IEEE ICSE, pp. 1-10, 2004.*

Dmitriev, "Profiling java applications using code hotswapping and dyanmic call graph revelation" ACM WOSP,, 139-150, 2004.*

Odom et al, "Using dynamic tracing sampling to measure long running programs", IEEE SC, pp. 1-10, 2005.*

IBM Technical Disclosure Bulletin, "Processor Architecture for Measurement and Monitoring Functions," vol. 32, No. 9A, Feb. 1990.

IBM Technical Disclosure Bulletin, "Process for Real-Time, Trace-Driven Performance Monitors," vol. 34, No. 5, Oct. 1991.

IBM Technical Disclosure Bulletin, Programmable Performance Monitor Apparatus for a Multi-Chip Super Scalar Processor, vol. 37, No. 04B, Apr. 1994.

IBM Research Disclosure No. 42898, "Automated Inclusion of Program Tracing Statements," Dec. 1999.

IBM Research Disclosure No. 431, "Dynamic Monitoring of System Parameters," Mar. 2000.

* cited by examiner

| Name | %Time | Seconds | Cumsecs | #Calls | msec/call |
|---|---|---|---|---|---|
| .main | 32.6 | 17.63 | 17.63 | 1 | 17630. |
| .mcount | 28.2 | 15.25 | 32.88 | | |
| .mod8 | 16.3 | 8.82 | 41.70 | 8990000 | 0.0010 |
| .mod9 | 9.9 | 5.38 | 47.08 | 6160000 | 0.0009 |
| .cos | 2.9 | 1.57 | 48.65 | 1920000 | 0.0008 |
| .exp | 2.4 | 1.32 | 49.97 | 930000 | 0.0014 |
| .log | 2.4 | 1.31 | 51.28 | 930000 | 0.0014 |
| .mod3 | 1.9 | 1.01 | 52.29 | 140000 | 0.0072 |
| .sin | 1.2 | 0.63 | 52.92 | 640000 | 0.0010 |
| .sqrt | 1.1 | 0.59 | 53.51 | | |
| .atan | 1.1 | 0.57 | 54.08 | 640000 | 0.0009 |
| .pout | 0.0 | 0.00 | 54.08 | 10 | 0.0 |
| .exit | 0.0 | 0.00 | 54.08 | 1 | 0. |
| .free | 0.0 | 0.00 | 54.08 | 2 | 0. |
| .free_y | 0.0 | 0.00 | 54.08 | 2 | 0. |

*FIG. 5*

```
Index by function name
[18] ._flsbuf          [37] .exit              [5]  .mod9
[34] ._ioctl           [6]  .exp               [43] .moncontrol
[20] ._mcount          [39] .expand_catname    [44] .monitor
[3]  ._mcount          [32] .free              [22] .myecvt
[23] ._nl_langinfo_std [33] .free_y            [28] .nl_langinfo
[11] ._stack_pointer   [16] .fwrite            [27] .pout
[24] .doprnt           [40] .getenv            [29] .printf
[35] .findbuf          [41] .ioctl             [9]  .qincrement
[19] .flsbuf           [42] .isatty            [13] .qincrement1
[36] .wrtchk           [8]  .log               [45] .saved_category
[25] .xflsbuf          [1]  .main              [46] .setlocale
[26] .xwrite           [17] .memchr            [14] .sin
[12] .atan             [21] .mf2x2             [31] .splay
[38] .catopen          [10] .mod3              [15] .sqrt
```

*FIG. 8*

DYNAMIC CPU USAGE PROFILING AND FUNCTION CALL TRACING

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

CROSS REFERENCE TO RELATED APPLICATIONS

Not Applicable

BACKGROUND OF THE INVENTION

1. Field of the Invention

This invention generally relates to the field of system characterization, and more particularly to CPU (Central Processing Unit) profiling and function call tracing for a target application to enable the identification of program bottlenecks, which cause slow performance.

2. Description of the Related Art

In spite of very fast computer hardware, such as a PowerParallel™ enterprise, and mature operating systems, such as AIX, a given target application's execution performance can be less than optimal. Applying profiling software to the target application on a given enterprise provides clues to answer the question: How can the target application be made to execute faster?

Profiling software is used to identify which portions of the target application are executed most frequently or where most of the time is spent. Profilers are typically used after a basic tool, such as vmstat or iostat commands point out a CPU bottleneck, which is causing slow performance. Tools such as vmstat and iostat report CPU and I/O statistics for the entire system. Using a predetermined benchmark, the profiler analyzes the target application to determine the place or places of the bottlenecks, which result in slow execution. Typically once these bottlenecks of CPU usage or function calls are determined, programming or reprogramming can be employed to reduce the bottleneck or in some cases eliminate it from the target application. These profiling tools, although useful have certain shortcomings. One shortcoming is that profiling tools require the source code of the target application. Many times the source code may not be available to the person running the profiling tests. It is not uncommon for source code to be treated as confidential. The person or entity profiling the software may not be the same entity that wrote the software. Accordingly, a need exists to overcome this problem of requiring the target application source code for profiling.

FIG. 1 is flow diagram 100, which illustrates a trace study flow of currently available prior art profiling and performance management tools. The flow is entered at step 102 when a need is identified for a study of a target application. This entails looking for any bottlenecks, such as waiting for an I/O resource and or the identification of any hot spots such as using a particular subroutine in the application. Step 104 identifies the intended focus of the trace that will be run, such as questioning why there is so much I/O activity. The target application's source code is determined to be available at step 106. If the target application's source code is not available, the flow is exited at step 116 and the trace study is abandoned. Given that the source code for the target application is available, one or more source files is recompiled with the "-pg" option. The intention here is to focus in on an area of the target application and determine if the activity makes sense. This is shown as step 108. The application is relinked with the -pg flag, as shown in step 110. The target application is now run at step 112, typically with a standard setup and benchmark so that over several runs the resultant trace data can be used for comparison between the different runs. As the target executes, the -pg flagged information is put into a gmon.out file at step 114. This output file is studied both directly and with certain standard profiling tools, such as gprof or IBM's Xprofiler. If the study is considered to be complete, at step 116 the flow is exited at step 118. If the study is not complete at step 116 then the -pg flag is reassigned to different points on the target application's source code at step 108 and the recompiling, relinking, run trace 112 and analyze the results 114 loop is repeated until the multiple trace runs provides sufficient information for the study to be considered completed.

It is noted that without the source code the profiling study cannot be made. In addition each time a new -pg flag assignment is made the target application must be recompiled and relinked. This recompiling step is time consuming and inhibits the spontaneous "what-if" workflow. It is difficult to just trace part of the target application that is, just 10% of the functions. For example, just 10% of the functions, or 10% of the execution time in a target application. Accordingly, a need exists to overcome these shortcomings and to provide a set of improved profiling tools to run traces with certain diagnostic tools and software probes that allow for optimizing of target applications.

Another shortcoming with the prior art profiling tools is the requirement that any changes to the profiling benchmarks cannot be made once the target application has started. Many times application developers want to examine applications from several perspectives with out being required to re-start the program execution. Accordingly, a need exists to enable changes in the benchmarking tools after the target application has started execution.

Still another shortcoming of the performance and profiling tools available today is the requirement to recompile and/or relink the target application every time the performance and managing tool is used. Typically a -pg flag must be used in the Unix environment. The need to recompile and/or relink the source code with special debugging flags many times restricts the user from making timely or spontaneous changes to the application. Each time the -pg flag is changed the application must be recompiled and relinked. Accordingly, a need exists to provide a solution to overcome this shortcoming as well.

Yet another shortcoming with the prior art performance profiling tools is how the results of a function trace are reported. Today, each function in a file compiled with -pg will have a corresponding entry in the gmon.out file. Since the choice of what to profile can only be done at the file level, this could potentially leas to a lot of unwanted data.

The trace output file in format of a gmon.out file does have a set of tools that are used to further identify and understand the location of the bottlenecks. It is desirable for any new and improved trace characterization technique to output the results in the gmon.out file format, which is familiar to the user and allows for continued usage of the characterization tools.

Accordingly, a need exists for a trace characterization technique that will not only eliminate all of the shortcomings listed above but also maintain compatibility with existing output and analysis tool formats.

SUMMARY OF THE INVENTION

Briefly, according to the present invention, disclosed is a method, a system and computer readable medium for characterizing a target application using DPCL (Dynamic Probe Class Library) instrumentation, without the need for the source code, or any recompiling or relinking. The instrumentation consists of the selection of suspected hot spots or bottlenecks in the target application and dynamically patching the code to insert calls to the monitor( ) and mcount( ) functions or their equivalents, based on the operating system being used. The characterization can be applied while the target application is running. The characterization output is presented in a gmon.out format.

The method for profiling a target application running on an informational processor begins with applying DPCL (Dynamic Probe Class Library) instrumentation. The DPCL instrumentation applied includes selecting at least one function in the target application to be traced. The method of profiling a target application running on an informational processor begins with applying DPCL instrumentation. The DPCL instrumentation selects at least one function in the application and dynamically patches in calls to the appropriate performance-gathering interfaces. Next, the application is started (if it is not already running), and the results are then written out in gmon.out format for the selected functions.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be apparent from the following detailed description taken in conjunction with the accompanying drawings.

FIG. 5 is a table, which lists the prof command output for a modified version of the Whetstone benchmark program, according to the present invention.

FIG. 8 is a list of cross-references of system calls, according to the present invention.

DETAILED DESCRIPTION OF AN EMBODIMENT

Figure 1:
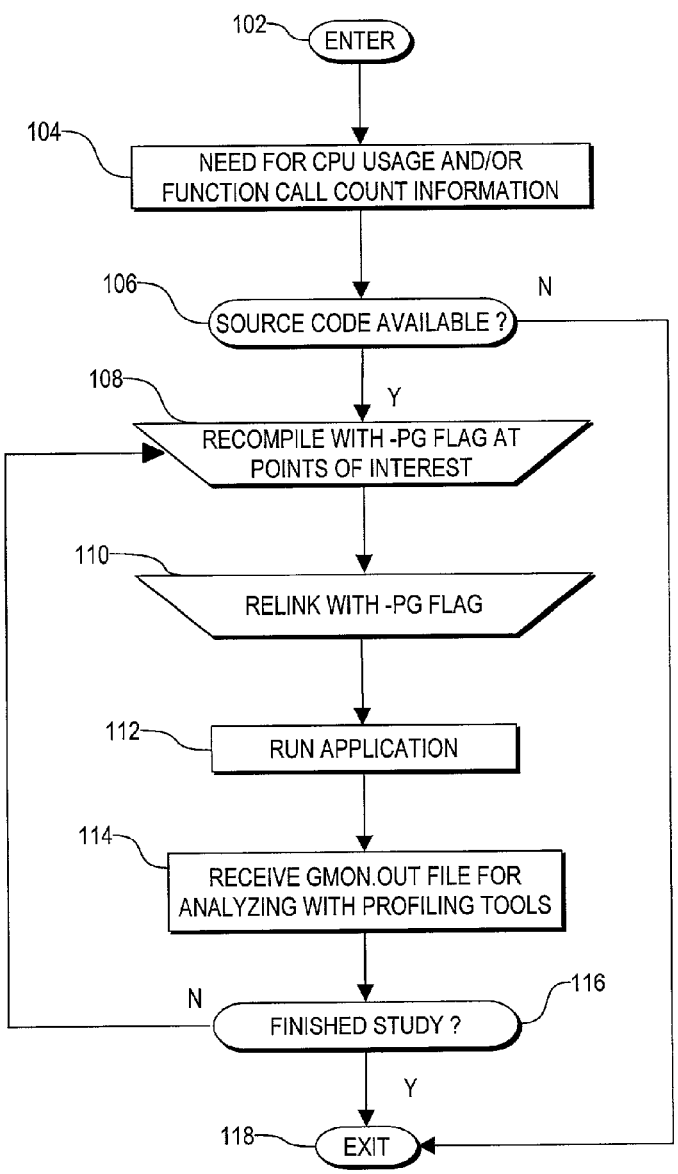
FIG. 1 is a flow diagram for the processing of a trace upon a target application, according to the prior art.

It is important to note that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

In the drawing like numerals refer to like parts through several views.

DISCUSSION OF HARDWARE AND SOFTWARE IMPLEMENTATION OPTIONS

The present invention as would be known to one of ordinary skill in the art could be produced in hardware or software, or in a combination of hardware and software. However in one embodiment the invention is implemented in software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium, which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, and cache memory.

Exemplary Hardware for a Multi-Computer System

In one embodiment, the techniques of the present invention are used in distributed computing environments in order to provide multi-computer applications. These applications are used in very demanding applications such as finance, computational chemistry, bioinformatics, weather prediction and even military types of applications. These applications are very complex and are being used in a multi-computer environment. In order to reduce the processing time and improve the ability to make even finer characterization runs, every effort is made to assure that the application has been optimized and that any bottlenecks are eliminated. One example of the hardware that runs these types of applications is the IBM RISC System/6000 Scalable PowerParallel™ systems, also known as the SP system.

An "N" way Multiprocessing Enterprise

Figure 2:
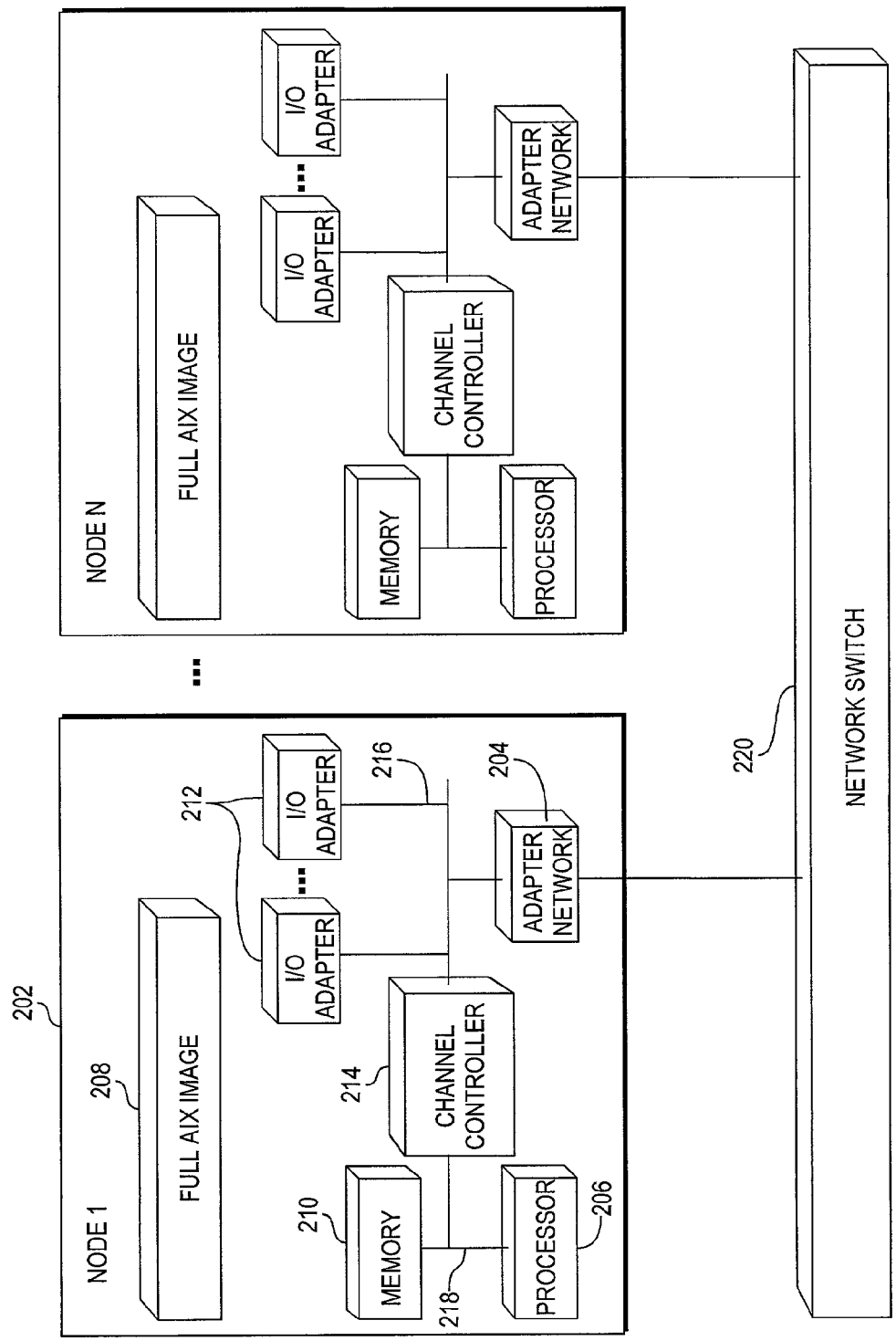
FIG. 2 depicts one example of a highly parallel-distributed multiprocessor computing environment incorporating the principles of the present invention.

FIG. 2 consists of a block diagram 200 of a distributed computing environment that includes a plurality of nodes 202 coupled to one another via a plurality of network adapters 204. Each node 202 is an independent computer with its own operating system image 208, channel controller 214, memory 210 and processor(s) 206 on a system memory bus 218, a system input/output bus 216 couples I/O adapters 212 and network adapter 204. Each network adapter is linked together via a network switch 220.

In one example, distributed computing environment 200 includes N nodes 202 with one or more processors 206. In one instance, each processing node is a RISC/6000 computer running AIX, the IBM version of the UNIX operating system. The processing nodes do not have to be RISC/6000 computers running the AIX operating system. Some or all of the processing nodes 202 can include different types of computers and/or different Unix based operating systems 308. All of these variations are considered a part of the claimed invention.

Exemplary Software for a Multi-Computer System

Figure 3:
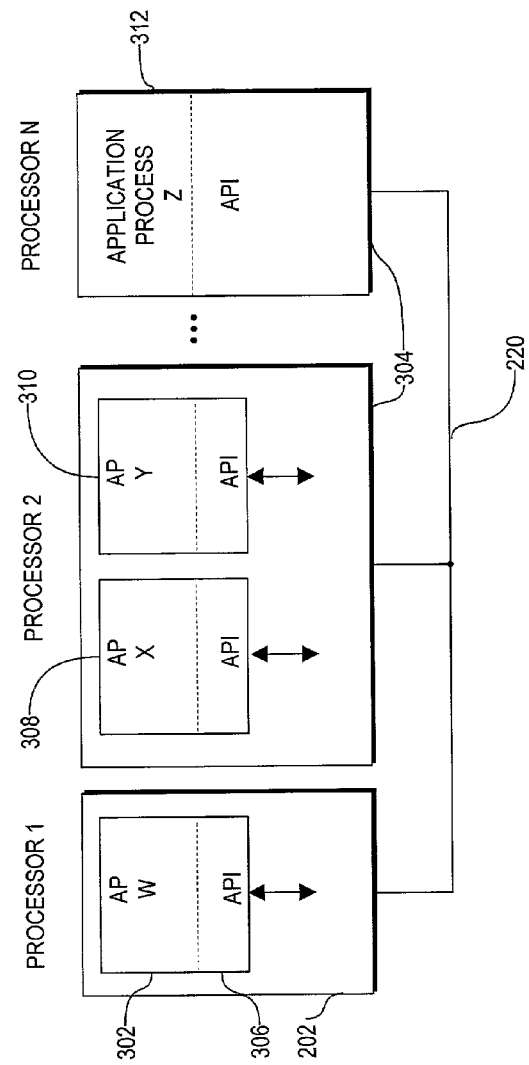
FIG. 3 is a block diagram of an exemplary software hierarchy that is executed on the hardware of FIG. 2., according to the present invention.

In FIG. 3 is shown an expanded view 300 of a number of processing nodes which includes Processor 1 202, and Processor 2 through N 304 of the distributed computing environment 200 of FIG. 2, according to the present invention. In one embodiment, an application program AP W 302 that is used for very complex applications is running on Processor 1 202. This complex application may in fact be distributed and running on the other processors under AP X 308, AP Y 310 and AP Z 312. Alternatively, these other processors 308 through 312 may be running different applications. The application program 302 interfaces with the other processing nodes 202 on the network switch 220 using API (Application Program Interface) 306. A given target application upon which profiling is to be performed may be running on one if the processors 202. Alternatively, as explained above, the target application may be running on several of the processors here show as processors 1, 202 through processor N, 312. It is into this very complicated multi-computer environment with distributed software that the present invention is used to measure the real CPU usage and function calls by using profiling software in accordance with the present invention. With this information, optimizations can be performed to tune and improve the processor time and the demand on system level resources.

Flow Diagram of a Trace Characterization

Figure 4A:
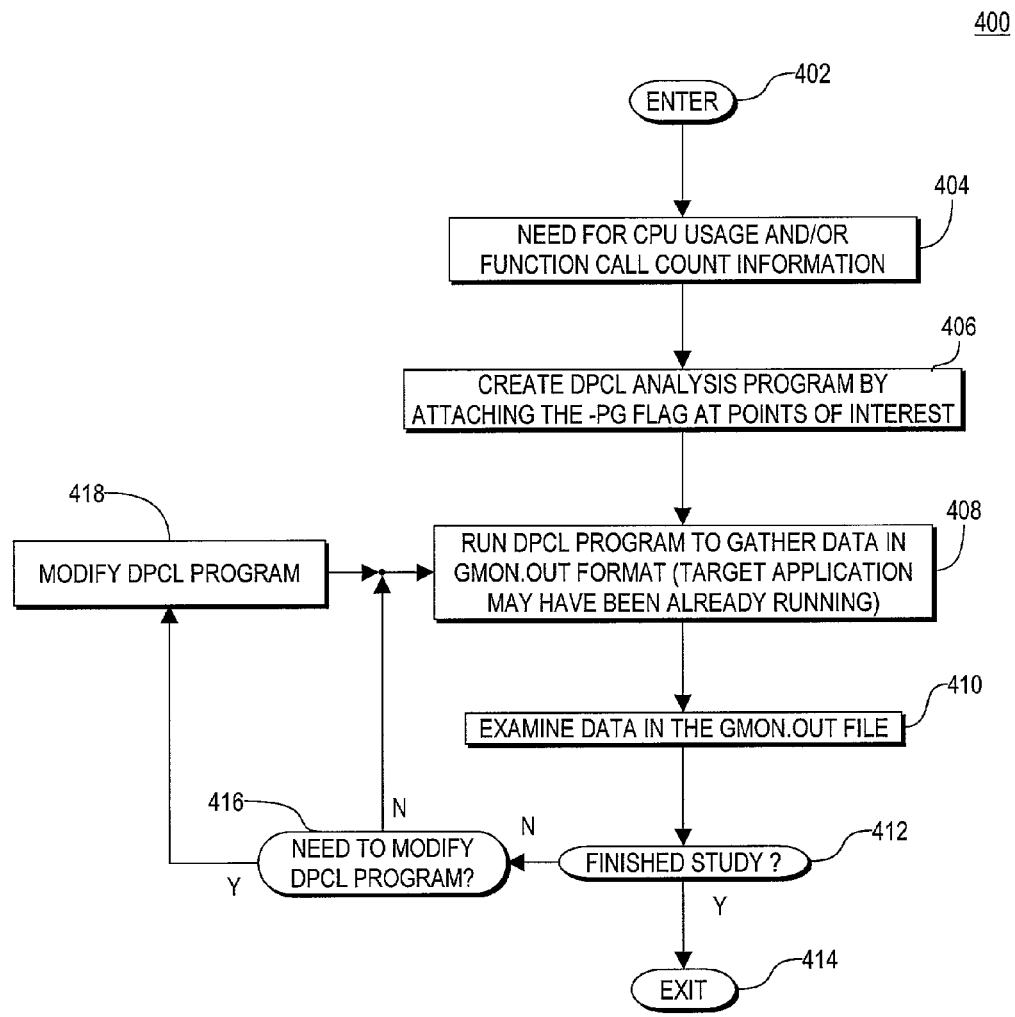
FIG. 4A is a flow diagram of the processing of a trace on a target application of FIG. 3, executing on one or more processors according to the present invention.

FIG. 4A illustrates a functional flow block diagram 400, of the processing of a trace on a target application such as AP W 302 of FIG. 3, executing on one or more processors 202 according to the present invention. The flow is entered at step 402 when the need for CPU usage and/or function call count information is required at step 404. A DPCL program is created at step 406. This program dynamically modifies the target application by inserting calls to the appropriate profile-gathering functions. A DPCL program is created at step 406. This program dynamically modifies the target application by inserting calls to the appropriate profile-gathering functions when the target application is run at step 408. The date is gathered in gmon.out format. Step 408 is illustrated in more detail in FIG. 4B below.

As described in the glossary, the term DPCL (IBM's Dynamic Probe Class Library) is just one mechanism for inserting dynamic instrumentation (i.e., changing the program selectively while it is running). It should be understood of to those of average skill in the art, that the present invention can be implemented using a different framework for dynamic instrumentation other than DPCL within the true scope and spirit of the present invention.

The target application may then be started or may have already been running. Unlike the prior art, the trace application is dynamic and can be applied to the target application at any time and without re-compiling or relinking. Once the user decides that sufficient data has been gathered, the results are examined at step 410. This examination can be "real-time": the results can be viewed as the data is being produced. This output file can be analyzed using compatible profiling tools according to the prior art. If the study is determined to be completed at step 412 the flow exits at step 414. If there is a need to modify the DPCL tool, according to step 416, for additional analysis this is accomplished at step 418 and the target application is executed again starting at step 408. If the DPCL tool is not modified at step 416 the target application may be re-started for additional trace information based on new benchmarks or a different platform set of parameters. This is repeated on the target application, until the analysis is finished and the flow exits at 414.

For a given target application, the function call-count and CPU usage information is collected. Using the DPCL class library, the user can construct a separate DPCL tool that can examine the target application in a non-invasive way. In other words, the user does not need to statically instrument the target application by recompiling and relinking it with the -pg compiler/link flag. Instead, the application is started directly or the DPCL tool would start the target application and then the DPCL analysis tool connects to the application. This is in much the same way that a debugger connects to a target application. This collects the information dynamically as the program runs, saves the information in standard gmon.out format, and then disconnects from the application.

The DPCL class library itself encapsulates and hides the low-level mechanisms of connecting to the target application and examining the application. It is a straightforward matter to take advantage of the flexibility that the DPCL affords to combine DPCL with the standard pieces of process profiling in UNIX to create a dynamic non-invasive profiling tool.

High Level CPU Profiling Control Flow Diagram

Figure 4B:
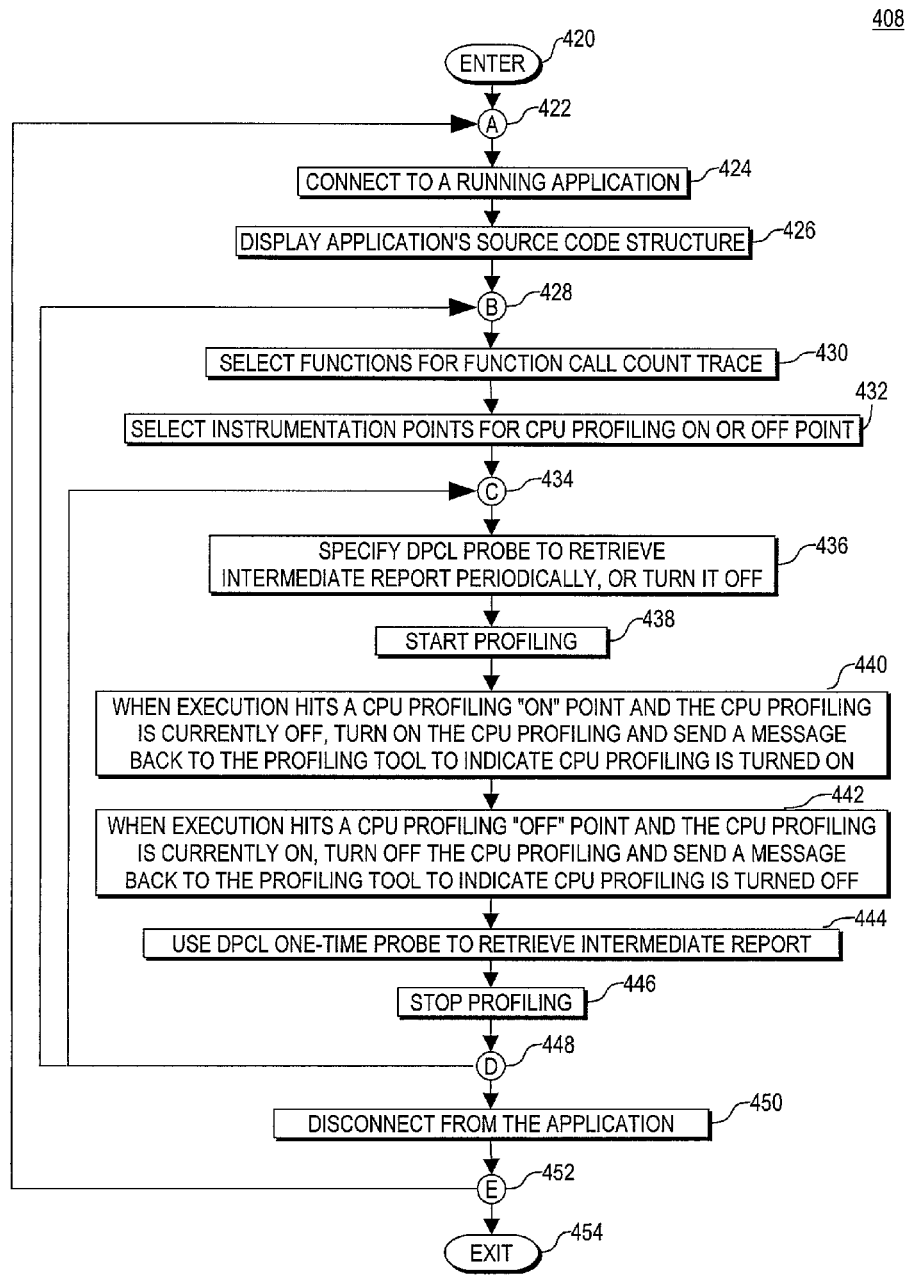
FIG. 4B is a detailed flow diagram of the step 408 of FIG. 4A of the details of the use of the DPCL as applied to the target application according to the present invention.

Turning now to FIG. 4B, described is a function control flow diagram 408. This is a detailed description of the step 408 in FIG. 4A. The flow is entered at step 420 when there is a need to connect the profiling tool to a running application 302 at step 424. Node A 422 is the point at which a stopped profiling execution can be restarted. The application's source code structure is displayed at step 426. It is noted that this is not the source code but the function level view. The source code is not itself needed, nor is any recompiling or relinking of the target application necessary. Node B 428 is the point at which a new setup for profiling can be applied, without stopping the target application. At step 430 the CPU profiling and function call count is applied the desired functions, regardless of whether they are application functions or system library functions. Once CPU profiling is turned on, an instrumentation point is selected, step 432, this applies to every function that is executed, until either it is turned off, or the application completes its execution. Node C 434 is the point where DPCL probes can be turned on or off. Step 436 shows the creation of a DPCL probe that can retrieve intermediate results. The profiling can now begin at step 438.

When execution hits a CPU profiling "on" point and the CPU profiling is currently off, the CPU profiling is turned on and a message is sent back to the DCPL tool to indicate CPU profiling is turned on, at step 440. When execution hits a CPU profiling "off" point and the CPU profiling is currently on, the CPU profiling is tuned off and a message is sent back to the DPCL tool to indicate that CPU profiling is turned off at step 442.

Once the target application has been running for sufficient time a DPCL one-time probe can be used to retrieve a intermediate report at step 444. Note the profiling can be stopped at step 446. Now at step D 448 the operator can decide to loop back to step B 428 and either re-enter a profiling run, or at point C step 434 re-select functions for profiling and functional call count tracing.

Finally the profiling is completed at step 446. If needed at point D 448 the target application can be re-engaged at node a 422. Alternatively, different DPCL probe points for intermediate reports can be specified at point C 434. If no new or different profiling is desired at points B or C the present invention disconnects from the application at step 450. At point E 452 an entirely different target application can be selected and connected to at point A 442; if not the flow exits at step 454.

DETAILED DISCUSSION OF FUNCTION TRACING AND CPU PROFILING

The following discussion is provided for those skilled in the art to be able to use the present invention.

Before a profiling study can begin to locate hot spots in a target application, the target application must be fully functional and have realistic data values to be profiled with. A key command used in the profiling is the prof command. The prof command displays a profile of CPU usage for each external symbol or routine of a target application. In detail, it displays the following:

The percentage of execution time spent between the address of that symbol and the address of the next.
The number of times that function was called.
The average number of milliseconds per call.

The prof command interprets the profile data collected by the monitor( ) subroutine for the object file (a.out by default), reads the symbol table in the object file, and correlates it with the profile file (mon.out by default) generated by the monitor( ) subroutine. A usage report is sent to the terminal or can be redirected to a file.

To use the prof command, the -p option is used to compile a source program in C, FORTRAN, PASCAL, or COBOL. This inserts a special profiling startup function into the object file that calls the monitor( ) subroutine to track function calls. When the program is executed, the monitor( ) subroutine creates a mon.out file to track execution time. Therefore, only programs that explicitly exit or return from the main program cause the mon.out file to be produced. Also, the -p flag causes the compiler to insert a call to the mcount( ) subroutine or its equivalent (depending on the operating system being used) into the object code generated for each recompiled function of the program. While the program runs, each time a parent calls a child function, the child calls the mcount( ) subroutine to increment a distinct counter for that parent-child pair. This counts the number of calls to a function.

By default, the displayed report is sorted by decreasing percentage of CPU time. This is the same as when specifying the -t option.

The -c option sorts by decreasing number of calls and the -n option sorts alphabetically by symbol name.

If the -s option is used, a summary file mon.sum is produced. This is useful when more than one profile file is specified with the -m option (the -m option specifies files containing monitor data).

The -z option includes all symbols, even if there are zero calls and time associated.

Other options are available and explained in the prof command in the AIX Commands Reference.

Turning now to FIG. 5 illustrated is a table 500 which shows the first part of the prof command output for a modified version of the Whetstone benchmark (Double Precision) program.

Line 502 of table 500 contains the headings, and describing them from left to right:

The column Name 504 contains the name of the subroutine.
The %Time 506 column is the share of the total time that a given routine has used during the execution of the target application.
The column Seconds 508 is the seconds for the listed subroutine to execute.
The Cumsec column 510 is the total number of seconds used by the subroutine during the execution of the target application.
The #Calls column 512 is the amount of times that the subroutine has been called by the execution of the trace application.
Finally the column msec/call 514 is the amount of milliseconds per call that the given subroutine takes to execute during the target application's execution.

Lines 516 list the example output with all of the subroutine calls. Given this list, the question is: Are the subroutines using an appropriate amount of execution time?

It is also noted that the calls to the different subroutines are summarized here. The previous art would list each and every call. This would result in a very large output file with no real added value.

In this example, many calls to the mod8( ) line 518 and mod9( ) line 520 routines are made. With this as a starting point, the source code would be examined to see why they are used so much. Another starting point could be to investigate why a routine requires so much time. With these starting points one skilled in the art can tune and optimize the target application using the subject invention.

The Gprof Command

The gprof command produces an execution profile of C, PASCAL, FORTRAN, or COBOL programs. The statistics of called subroutines are included in the profile of the calling program. The gprof command is useful in identifying how a program consumes CPU resources. It is roughly a superset of the prof command, giving additional information and providing more visibility to active sections of code.

The Gprof Implementation

The source code must be compiled with the -pg option. This action links in versions of library routines compiled for profiling and reads the symbol table in the named object file (a.out by default), correlating it with the call graph profile file (gmon.out by default). This means that the compiler inserts a call to the mcount( ) function into the object code generated for each recompiled function of the target application. The mcount( ) function counts each time a parent calls a child function. Also, the monitor( ) function is enabled to estimate the time spent in each routine.

The gprof command generates two useful reports:
  The call-graph profile FIG. 6 below, which shows the routines, in descending order by CPU time, plus their descendants. The profile lists which parent routines called a particular routine most frequently and which child routines were called by a particular routine most frequently.
  The flat profile of CPU usage FIG. 7 below, which shows the usage by routine and number of calls, similar to the prof output.

Each report section begins with an explanatory part describing the output columns. These pages can be suppressed by using the -b option.

Use -s for summaries and -z to display routines with zero usage.

Where the program is executed, statistics are collected in the gmon.out file. These statistics include the following:
  The names of the executable program and shared library objects that were loaded
  The virtual memory addresses assigned to each program segment
  The mcount( ) data for each parent-child
  The number of milliseconds accumulated for each target application segment When the gprof command is issued, it reads the a.out and gmon.out files to generate the two reports. The call-graph profile is generated first, followed by the flat profile. It is best to redirect the gprof output to a file, because browsing the flat profile first may answer most questions about the target application.

Cwhet Benchmark Program Output File

Figure 6:
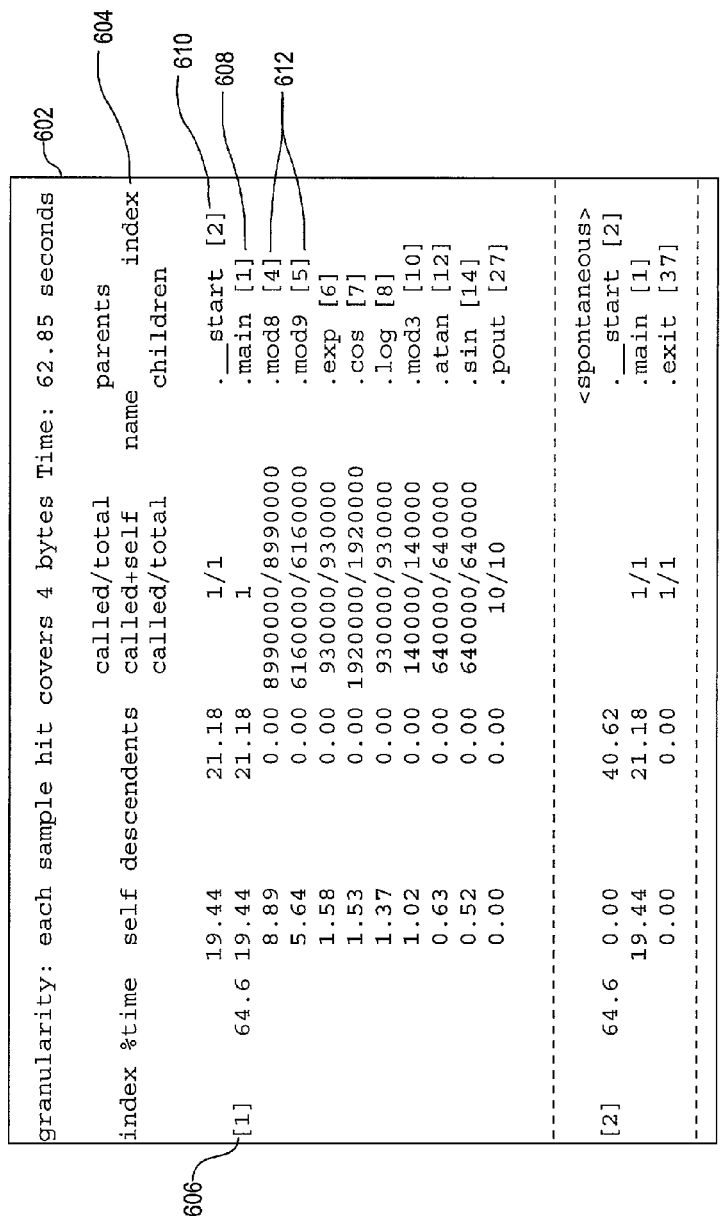
FIG. 6 is a table, which lists the Call-Graph Profile, the first part of the cwhet.gprof file output, according to the present invention.

Turning now to FIG. 6, table 600 contains an example of the profiling for the cwhet benchmark program. This example is also used in The Prof Command listed below:
cc -o cwhet -pg -lm cwhet.c
cwhet>cwhet.out
gprof cwhet>cwhet.gprof Call-Graph Profile The call-graph profile is the first part of the cwhet.gprof file and looks similar to FIG. 6 containing the table 600 according to the present invention. In the table 600 of FIG. 6 the granularity, line 602 lists that each program address sample cover four bytes (see UNIX "profil" for more information) and that the program subroutine ran for 62.85 seconds. Usually the call graph report begins with a description of each column of the report, but it has been deleted in this example. The column headings vary according to type of function (current, parent of current, or child of current function) as in line 604. The current function is indicated by an index in brackets at the beginning of the line. Functions are listed in decreasing order of CPU time used. To read this report, look at the first index [1] in the left-hand column, 606. The main function, 608 is the current function. It was started by _start, 610 (the parent function is on top of the current function), and it, in turn, calls mod8 and mod9, 612 (the child functions are beneath the current function). All the accumulated time of main 608 is propagated to _start 610. The self and descendants columns of the children of the current function add up to the descendants entry for the current function. The current function can have more than one parent. Execution time is allocated to the parent functions based on the number of times they are called.

Flat Profile of Cwhet.Gprof Sample

Figure 7:
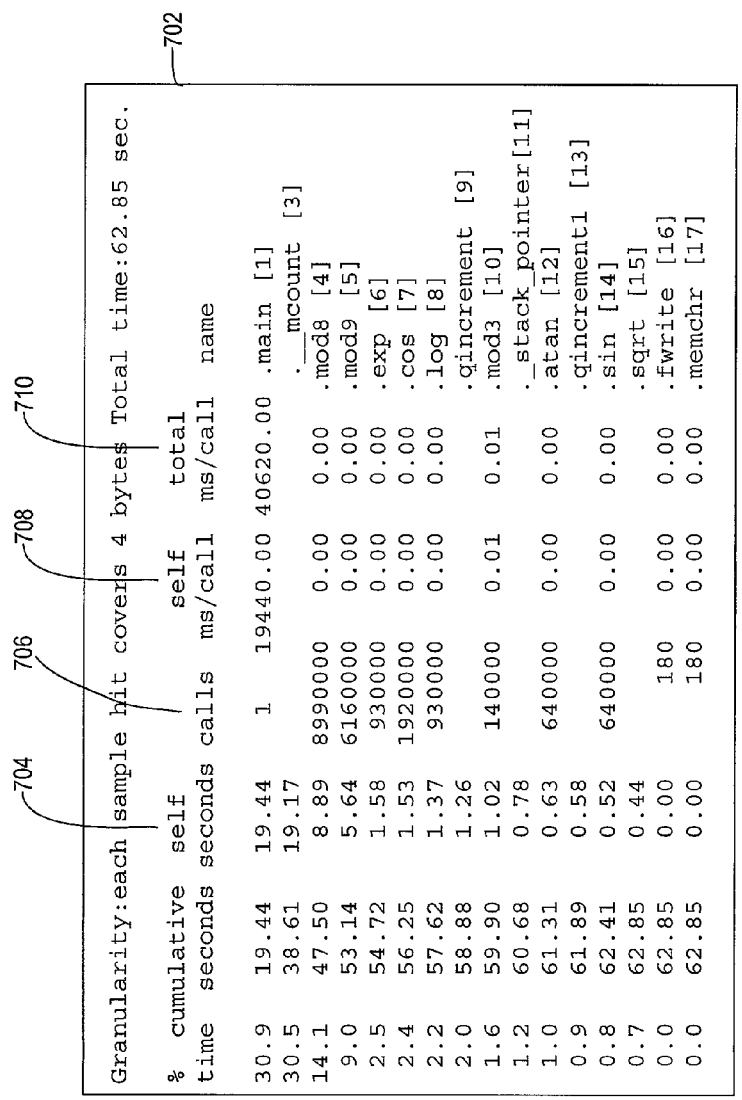
FIG. 7 is a table, which lists the Flat Profile, the second part of the cwhet.gprof file output, according to the present invention.

Turning now to FIG. 7 containing table 702, the flat profile sample is the second part of the cwhet.gprof file.

The flat profile is much less complex than the call-graph profile of FIG. 6 above, and very similar to the output of the prof command. As with FIG. 6 the granularity is taken to be four bytes and the runtime is 62.85 seconds. The primary columns of interest are the self-seconds, 704 and the calls columns 706. These reflect the CPU seconds spent in each function and the number of times each function is called. The next columns to look at are self ms/call, 708 which is the CPU time used by the body of the function itself, and total ms/call 710, which is the time in the body of the function plus any descendent functions called.

Normally, the top functions on the list are candidates for optimization. However, care should be taken to also consider how many calls are made to the function. Sometimes it can be easier to make slight improvements to a frequently called function than to make extensive changes to a piece of code that is called once.

Cross Reference Index

Turning now to FIG. 8, which shows a table 800 of indexes by function name.

Glossary of Terms Used in this Disclosure

AIX—is an operating system from IBM that is based on a version of UNIX. AIX is an operating system that runs on IBM's workstation platform, the RISC System/6000.

DPCL—is an acronym for IBM's Dynamic Probe Class Library. It is an object based C++ class library that provides the necessary infrastructure to allow tool developers and sophisticated tool users to build parallel and serial tools through technology called dynamic instrumentation. Dynamic instrumentation allows users to choose which functions(s) in a target application to be traced, and what trace option(s) to be used all at runtime. Additionally all the decisions can be made and changed after the target application has been stared.

Dynamic Instrumentation—is a more general term for DPCL. Dynamic Instrumentation is a technique for examining the structure and data of a target application while it is running. In addition, the target application can be started or stopped, and new instructions can be put into the application while it is running.

-p—a subset of -pg

-pg—is a standard UNIX complier and linker option. Its is divided into two parts: CPU profiling and function call count. The CPU profiling is applied to every function, regardless if it is an application function or a system library function. Once CPU profiling is turned on, it applies to every function that is executed, until either it is turned off, or the target application completes its execution. Function call counting records which functions call other functions Target Application—is the application that the user wants to tune or study or to profile.

Non-Limiting Examples

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method for profiling a target application running on an informational processor, the method comprising:
   using DPCL (Dynamic Probe Class Library) instrumentation for;
      selecting at least one function and/or CPU usage in a target application to be traced;
      attaching a -p and/or -pg flag to the at least one function or CPU usage;
      running at least part of the target application; and
      writing one or more results of the at least one function and/or CPU usage with the attached -p and/or -pg flag in a gmon.out format.

2. The method according to claim 1, wherein the step of running includes changing the selection of the at least one function and/or CPU usage placement in the target application that is already running.

3. The method according to claim 1, wherein the step of running includes stopping the target application before the completion of the target application.

4. The method according to claim 1, wherein the step of attaching a -p and/or -pg flag includes adding or deleting at least one -p and/or -pg flag while the target application is running.

5. The method according to claim 4, the method comprising;
   analyzing the gmon.out output file with standard characterization tools.

6. The method according to claim 1 wherein the step of attaching a -p and/or -pg flag to the target application includes attaching a -pg flag into the target application program directly and without the use of source code for the target application.

7. The method according to claim 6, wherein the step of attaching a -p and/or -pg flag to the target application includes attaching a -pg flag into the target application program directly and without the need to recompile and/or relink the target application.

8. The method according to claim 1 wherein the step of writing one or more results of the at least one function and/or CPU usage with the attached -p and/or -pg flag in a gmon.out format further comprising;
   totaling the at least one function and/or CPU usage with a -p and/or -pg flag into a summary register so as to provide a running total.

9. A tangible embodied computer readable storage medium containing programming instructions for profiling a target application running on an informational processor, the program instructions comprising instructions for:
   using DPCL (Dynamic Probe Class Library) instrumentation for;
      selecting at least one function and/or CPU usage in a target application to be traced;
      attaching a -p and/or -pg flag to the at least one function or CPU usage;
      running at least part of the target application; and
      writing one or more results of the at least one function and/or CPU usage with the attached -p and/or -pg flag in a gmon.out format.

10. The computer readable medium of claim 9, comprising the instructions for changing the selection of the at least one function and/or CPU usage placement in the target application that is already running.

11. The computer readable medium of claim 9, comprising the instructions for stopping the target application before the completion of the target application.

12. The computer readable medium of claim 9, comprising the instructions for attaching a -p and/or -pg flag includes adding or deleting at least one -p and/or -pg flag while the target application is running.

13. The computer readable medium of claim 12, comprising the instructions for:
   analyzing the gmon.out output file with standard characterization tools.

14. The computer readable medium of claim 9, comprising instructions for attaching a -p and/or -pg flag to the target application includes attaching a -pg flag into the target application program directly and without the use of source code for the target application.

15. The computer readable medium of claim 14, comprising instructions for attaching a -p and/or -pg flag to the target application program directly and without the need to recompile and/or relink the target application.

16. The computer readable medium of claim 9, comprising instructions for writing one or more results of the at least one function and/or CPU usage with the attached -p and/or -pg flag in a gmon.out format further comprising:
   totaling the at least one function and/or CPU usage with a -p and/or -pg flag into a summary register so as to provide a running total.

17. A data processing system having at least one processing element running under an operating system comprising:
   a target application program running under an operating system;
   a benchmark application for profiling the target application;
   a DPCL diagnostic instrumentation for at least one function and/or CPU usage in which a -p or -pg flag has been attached; and,
   a output file in a gmon.out file format for collecting the results of the at least one function and/or CPU usage with the attached -p and/or -pg flag attached.

18. A data processing system according to claim 17, further comprising an input device for control of the DPCL diagnostic instrumentation.

19. A data processing system according to claim 18, further comprising a input device for changing the DPCL diagnostic instrumentation during the operation of the target application.

* * * * *